(12) United States Patent
Bui et al.

(10) Patent No.: US 9,195,954 B2
(45) Date of Patent: *Nov. 24, 2015

(54) AUTONOMIC MANUFACTURING OPERATOR AUTHORIZATION ADJUSTMENT

(71) Applicant: International Business Machines Corporation, Armonk, NY (US)

(72) Inventors: Hung D. Bui, Singapore (SG); Ivory W. Knipfer, Rochester, MN (US); Eng H. Koh, Singapore (SG); Ser H. Tan, Singapore (SG); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/754,886

(22) Filed: Jan. 30, 2013

(65) Prior Publication Data

US 2013/0144673 A1 Jun. 6, 2013

Related U.S. Application Data

(63) Continuation of application No. 12/817,553, filed on Jun. 17, 2010.

(60) Provisional application No. 61/229,556, filed on Jul. 29, 2009.

(51) Int. Cl.
*H04L 9/00* (2006.01)
*G06Q 10/06* (2012.01)

(52) U.S. Cl.
CPC ........ *G06Q 10/063116* (2013.01); *G06Q 10/06* (2013.01); *G05B 2219/36542* (2013.01)

(58) Field of Classification Search
CPC ............................... G06F 21/31; H04L 63/00
USPC .......... 726/2, 4, 17, 21, 27; 712/42, 220, 240; 707/694, 700, 701, 705, 758
See application file for complete search history.

(56) References Cited

U.S. PATENT DOCUMENTS

| 6,157,808 | A | 12/2000 | Hollingsworth |
| 6,325,631 | B1 | 12/2001 | Kouba et al. |
| 6,519,571 | B1 | 2/2003 | Guheen et al. |
| 6,589,055 | B2 | 7/2003 | Osborne et al. |

(Continued)

*Primary Examiner* — Joseph P Hirl
*Assistant Examiner* — Leynna Truvan
(74) *Attorney, Agent, or Firm* — Martin & Associates, LLC; Derek P. Martin

(57) ABSTRACT

Operator authorizations are autonomically adjusted in many ways to automatically account for many different variables. Operator authorization may be adjusted according to an operator's past activity record so previous experience is not lost when the operator is rehired. Operator authorization may be adjusted according to the operator's quality and performance. Operator authorization may also be adjusted by recognizing similar operations to those the operator is authorized to perform, and authorizing the operator to perform one or more similar operations. Operator authorization may also be adjusted to a lesser level or may be revoked for an operation based on the passage of time. A manufacturing system may efficiently track operators taking into account different activity periods, the passage of time, the operator's performance, and similar operations to autonomically adjust the authorization of the operators as needed.

6 Claims, 12 Drawing Sheets

(56) References Cited

U.S. PATENT DOCUMENTS

| | | |
|---|---|---|
| 6,742,002 B2 | 5/2004 | Arrowood |
| 6,859,523 B1 | 2/2005 | Jilk et al. |
| 6,871,195 B2 | 3/2005 | Ryan et al. |
| 6,938,048 B1 | 8/2005 | Jilk et al. |
| 7,054,698 B2 | 5/2006 | Wegleitner et al. |
| 7,155,400 B1 | 12/2006 | Jilk et al. |
| 7,920,935 B2 | 4/2011 | Knipfer et al. |
| 2003/0167238 A1 | 9/2003 | Zeif |
| 2004/0117624 A1 | 6/2004 | Brandt et al. |
| 2007/0250905 A1 | 10/2007 | Clark et al. |
| 2009/0150223 A1* | 6/2009 | Sachedina ............... 705/10 |
| 2010/0235202 A1* | 9/2010 | Strelling et al. ............... 705/7 |

* cited by examiner

| Operator Trace Table |||||
|---|---|---|---|---|
| User ID/Alias | Current UserID | Date Activated | Past UserIDs ||
| ZEE BOB | ZBOB | 6/26/1989 | NONE | 610 |
| JANE DOE | VEND008 | 12/1/2007 | VEND003, VEND993 | 620 |
| JAMES JOHN | VEND8888 | 6/1/2007 | JJOHN | 630 |

Operator History for Jane Doe spans previous User IDs, Activities and Durations

| Product | Operation | Current Auth. | UserID | Days Since 1st Activity | Days Since Last Activity | Measured Performance | | | Override Authorization |
|---|---|---|---|---|---|---|---|---|---|
| | | | | | | Activity | | Quality | |
| | | | | | | Count | Period | Defect Rate | |
| 9406-570 | 0050 | Trainer | LAST | >15 | | | | | REVOKE |
| 9117-570 | TEST | ALL | ALL | | >60 | | | | CURRENT-1 |
| ALL | 0410 | ALL | ALL | | >120 | | | | REVOKE |
| 9119-595 | 0050 | ALL | ALL | | | | 3 mths | >5% | REVOKE |
| 9119-595 | TEST | Trainer | ALL | | >90 | | | >3% | REVOKE |
| 2150-D80 | 0300 | Expert | ALL | | | | | >2% | Intermediate |
| 2150-D80 | 0300 | Beginner | ALL | | | | | >1% | Intermediate |

FIG. 10

| Similar Operation Groups | | | | |
|---|---|---|---|---|
| Similar Operation ID | Key for Base Authorization | Current Performance Level | # Authorizations Within this Similar Operation Group | Authorization Recommended for Other Activities in this Similar Operation Group |
| G001 | 9406-570/0050<br>9117-570/0050<br>9119-595/0050 | Expert | 2 | Intermediate |
| | | | 1 | Beginner |

| Boolean Similar Operation Rules | | | | | |
|---|---|---|---|---|---|
| Similar Operation ID | Key for Base Authorization | Current Performance Level | Operand | Similar Operation Activity | Similar Operation Authorization Grant Level |
| S002 | 9119-595/TEST | Expert | > | 9119-595/0050 | Intermediate |

| Product | Operation | Bias Precedence |
|---|---|---|
| 9406-570 | 0050 | Highest |
| 9117-570 | 0050 | Lowest |
| ALL | 0410 | Performance |
| 9119-595 | 0050 | Similar Operation |

| Product | Operation | User ID | Start Timestamp | End Timestamp |
|---|---|---|---|---|
| 520 | 0200 | VEND008 | 2010-03-11-07.00.00 | 2010-03-11-07.17.00 |
| 550 | 0300 | VEND008 | 2010-03-11-07.18.00 | 2010-03-11-07.40.00 |
| 570 | 0050 | VEND008 | 2010-03-11-07.41.00 | 2010-03-11-08.11.00 |
| 570 | 0060 | VEND008 | 2010-03-07-07.00.00 | 2010-03-07-08.42.00 |

| Product | Operation | User ID | Defect Rate | Failures |
|---|---|---|---|---|
| 520 | 0050 | VEND008 | 1.3% | 7 |
| 550 | 0050 | VEND008 | 1.5% | 11 |
| 570 | 0050 | VEND008 | 1.7% | 8 |
| 570 | 0060 | VEND008 | 3.4% | 16 |

1600, 1610, 1620, 1630, 1640

AUTONOMIC MANUFACTURING OPERATOR AUTHORIZATION ADJUSTMENT

BACKGROUND

1. Technical Field

This disclosure generally relates to manufacturing systems, and more specifically relates to authorization of workers to perform operations in manufacturing systems.

2. Background Art

Many modern manufacturing environments require operators (or workers) to be certified to perform certain operations. This leads to a need to track the training for operators, manage the authorization of the operators, and track the certification of the operators. The tracking of operators and their training, certification and authorization is complicated by the use of temporary operators. Many manufacturing environments have a high percentage of temporary operators that may be laid off during periods of low activity and rehired when activity increases. Known systems have no way to account for an operator's past experience when the operator is rehired. When an operator is rehired, the company typically assigns a new user ID to the operator, which means the operator's past experience is not associated with the new user ID. The result is a significant amount of lost information, workmanship defects, negative cycle time impacts, and serious training deficiencies. Without a way to track a operator's authorization across multiple periods of activity and adjust the operator's authorization autonomically, the known ways of managing operators in a manufacturing environment will suffer from the drawbacks mentioned above.

BRIEF SUMMARY

Operator authorizations are autonomically adjusted in many ways to automatically account for many different variables. Operator authorization may be adjusted according to an operator's past activity record so previous experience is not lost when the operator is rehired. Operator authorization may be adjusted according to the operator's quality and performance. Operator authorization may also be adjusted by recognizing similar operations to those the operator is authorized to perform, and authorizing the operator to perform one or more similar operations. Operator authorization may also be adjusted to a lesser level or may be revoked for an operation if too much time has passed since the operator was certified for the operation or since the operator actually performed the operation. A manufacturing system may efficiently track operators taking into account different activity periods, the passage of time, the operator's performance, and similar operations to autonomically adjust the authorization of the operators as needed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a block diagram of a table that shows sample performance overrides shown in FIG. 2;

FIG. 12 is a block diagram of a table showing criteria for autonomically adding authorization for an operator to perform a similar operation;

FIG. 13 is a block diagram of a table showing Boolean similar operation rules that govern the autonomic addition of authorization for an operator to perform a similar operation;

FIG. 14 is a sample table for resolving potential conflicts in recommended adjustments to an operator's authorization;

FIG. 15 is a sample table of one specific implementation of the time phased operator performance 230 in FIG. 2;

FIG. 16 is a sample table of one specific implementation of the operator quality 220 in FIG. 2.

DETAILED DESCRIPTION

The claims and disclosure herein provide a way to autonomically adjust operator authorization in a manufacturing environment to account for the passage of time, for periods of past activity, for the operator's current performance and quality, and to provide authorization for similar operations. The autonomic adjustment of operator authorization is performed according to rules that may be defined by a system administrator and that may be updated or changed from time to time, thereby providing a manufacturing system that is very powerful and flexible in managing authorizations for operators.

Figure 1:
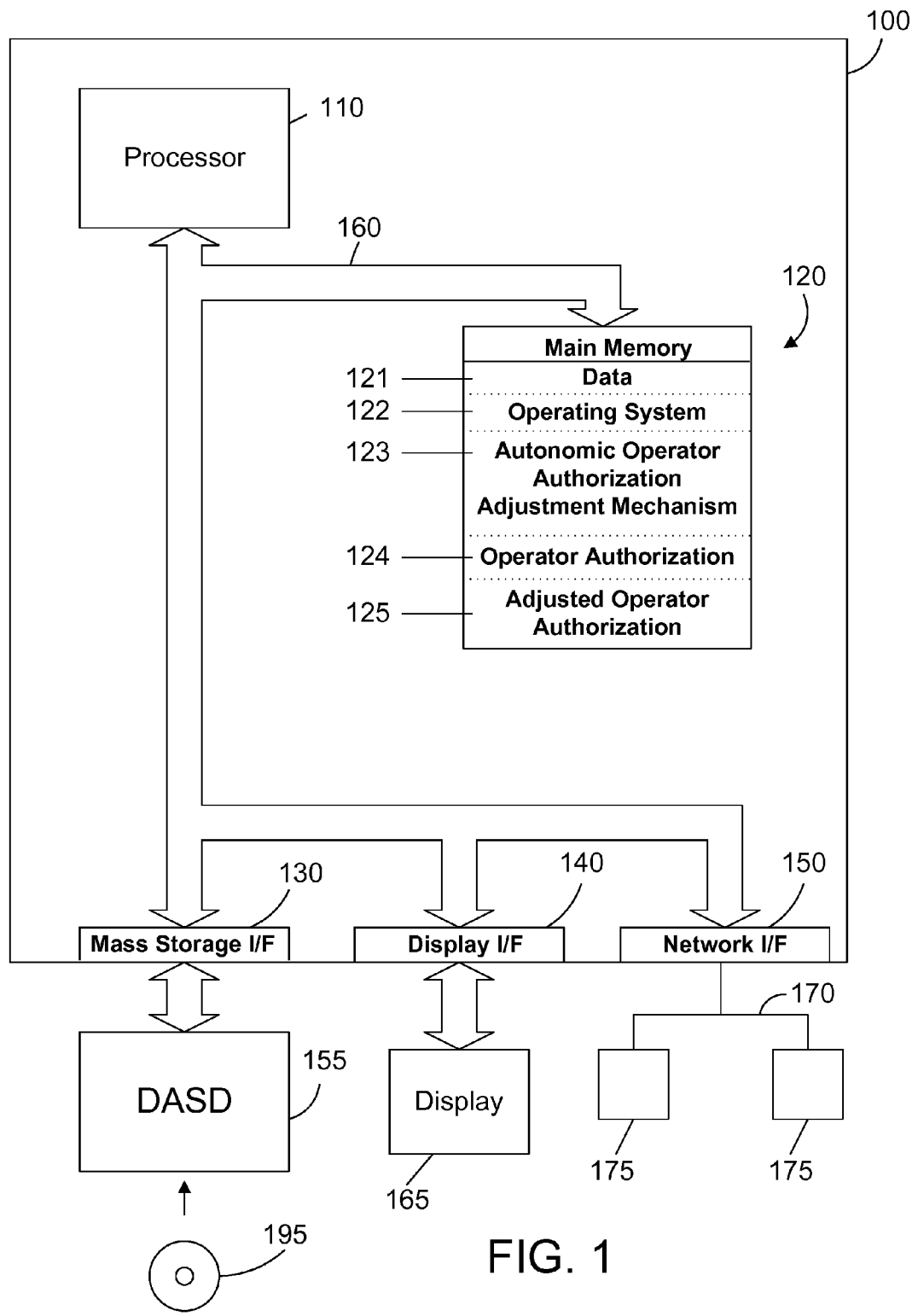
FIG. 1 is a block diagram of an apparatus that autonomically adjusts operator authorizations in a manufacturing environment.

Referring to FIG. 1, a computer system 100 is one suitable implementation of a computer system that autonomically adjusts operator authorizations in a manufacturing environment. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, an autonomic operator authorization adjustment mechanism 123, an operator authorization 124, and an adjusted operator authorization 125. Data 121 represents any data that serves as input to or output from any program in computer system 100. Operating system 122 is preferably a multitasking operating system. Autonomic operator authorization adjustment mechanism 123 autonomically adjusts an operator authorization 124 to produce an adjusted operator authorization 125. The autonomic operator authorization adjustment mechanism 123 may adjust the operator authorization according to many criteria, including past activity periods, the passage of time, current performance, and similar operations. Each of these is discussed in more detail below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, autonomic operator authorization adjustment mechanism 123, operator authorization 124, and adjusted operator authorization 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that autonomic adjustment of operator authorizations may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable non-transitory storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
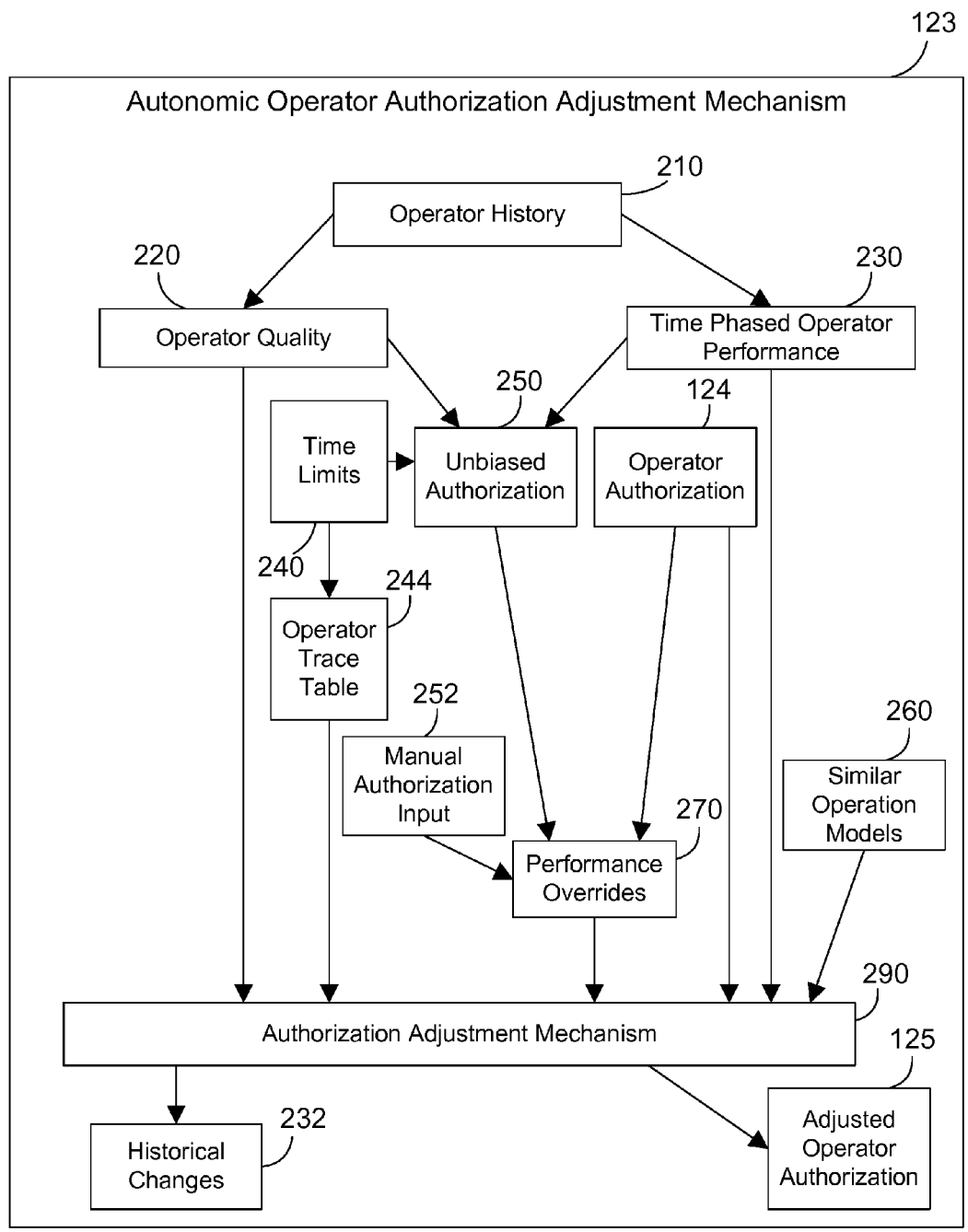
FIG. 2 is a block diagram of the autonomic operator authorization adjustment mechanism shown in FIG. 1.

Referring to FIG. 2, a suitable implementation for the autonomic operator authorization adjustment mechanism 123 in FIG. 1 is shown. An authorization adjustment mechanism 290 receives information from many sources, and generates an adjusted operator authorization 125 based on an operator authorization 124 and based on other information received from other sources. An operator history 210 preferably includes work history for one or more operators. This work history may include operator quality 220 and time phased operator performance 230. An operator trace table 244 preferably indicates a work history for one or more operators, where the work history may include various different activity periods separated by periods of inactivity. Operator trace table 244 is generated according to time limits 240. The time limits 240 specify one or more time thresholds that determine when an operator's past work experience may be considered and when authorization should be adjusted. For example, if an operator was certified to perform an operation more than a year ago but has had little experience since then, the time limits 240 may specify the amount of work experience that will be used by subsequent processes 250, 260 and 270 (e.g., the past 12 months of quality performance across two discontinuous periods of activity). The time limits 240 allow for specifying time thresholds that determine how much of an operator's past work experience, potentially spanning multiple different periods with different user IDs, will be taken into account when determining if an adjustment to an operator's authorization is needed.

An unbiased authorization 250 is generated from the operator quality 220 and the time phased operator performance 230. The unbiased authorization 250 reflects data relating to the operator's on-the-job performance that is not modified (or biased). In one specific implementation, the unbiased authorization 250 produces one or more operator authorizations that are derived solely from the operator's performance, without consideration of current operator authorization 124. Note the unbiased authorization 250 may take into account time limits 240 so that performance beyond a specified time threshold is not considered in generating the unbiased authorization 250, while performance within the specified threshold is used in generating the unbiased authorization 250, even when the specified threshold defines multiple periods of activity for an operator using multiple user IDs. Performance overrides 270 include one or more rules for adjusting an operator's authorization when specified criteria are met. The performance overrides 270 may consider an authorization 252 that is manually input, the unbiased authorization 250, and the current operator authorization 124. In one suitable implementation, three distinct operator authorizations may be specified in the manual authorization input 252, the unbiased authorization 250, and the operator authorization 124. The rules in the performance overrides 270 determine which of the operator authorizations will be used by the authorization adjustment mechanism 290 to generate the adjusted operator authorization 125.

The authorization adjustment mechanism 290 receives input from many sources, such as those shown in FIG. 2, and generates from an operator authorization 124 and from other information an adjusted operator authorization 125. One of the sources of input is similar operation models 260. The similar operation models 260 allow autonomically creating or adjusting operator authorization according to operations that are defined as similar operations in the similar operation models. The similar operation models 260 preferably define operations that are similar to each other, and define rules for generating or adjusting operator authorizations for similar operations. The similar operation models 260 are discussed in more detail below with reference to FIGS. 11-13.

The authorization adjustment mechanism 290 may also output historical changes 232. The historical changes 232 allow tracking of authorizations over time so the manufacturing processes may be appropriately audited and controlled.

Figure 3:
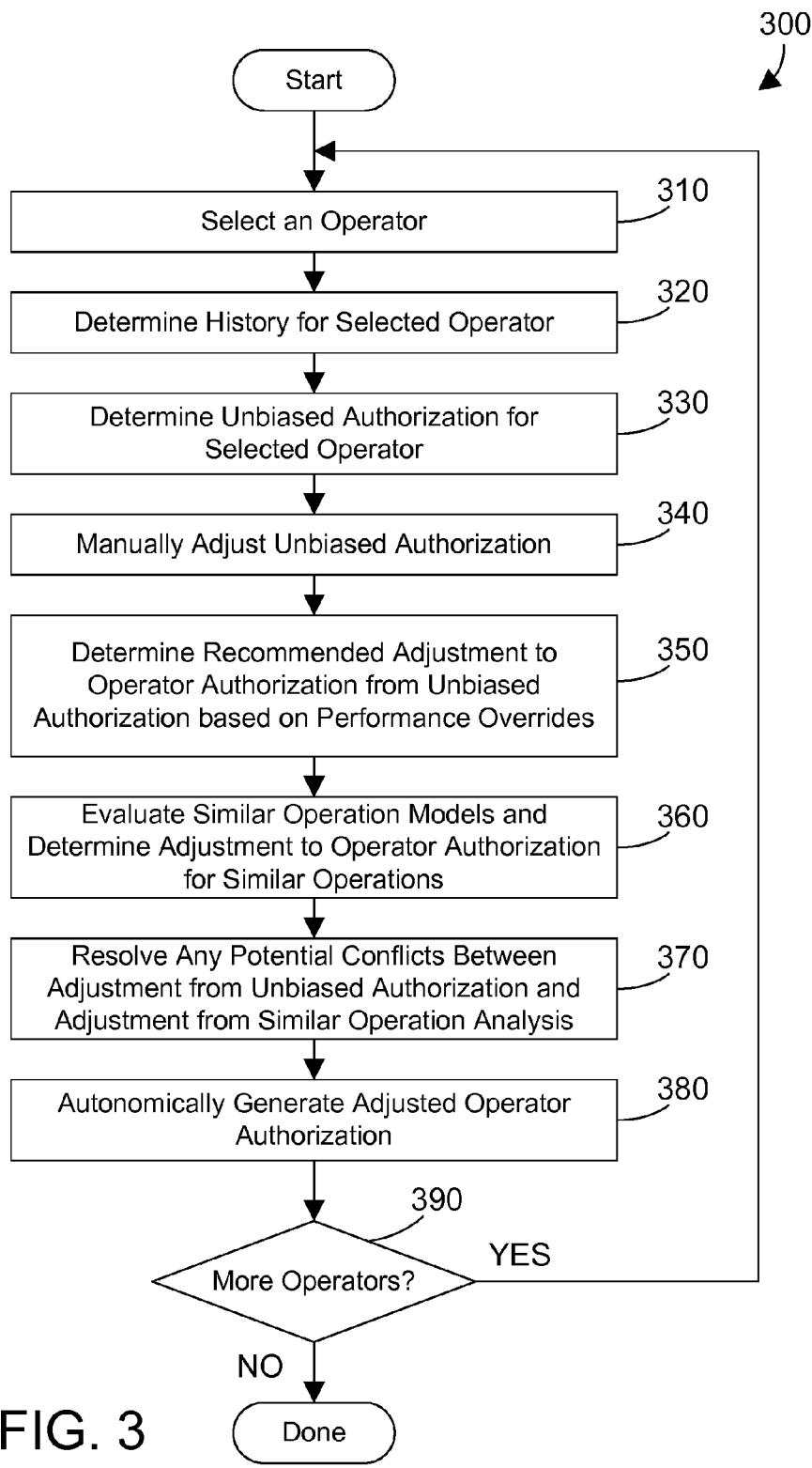
FIG. 3 is a flow diagram of a method for autonomically adjusting operator authorization.

Referring to FIG. 3, a method 300 is preferably performed by the autonomic operator authorization adjustment mechanism 123 shown in FIGS. 1 and 2. Method 300 begins by selecting an operator (step 310). The work history for the selected operator is determined (step 320). The work history determined in step 320 may include, for example, the operator quality 220 and time phased operator performance 230 shown in FIG. 2. Next, an unbiased authorization for the operator is determined (step 330), as represented at 250 in FIG. 2, according to the time limits 240. The unbiased authorization may be manually adjusted as required (step 340). A simple example will illustrate why manually adjusting the unbiased authorization in step 340 may be required. Let's assume the unbiased authorization indicates an operator is authorized to do a specific test. However, if the equipment is new and complicated, the system administrator may want to limit this test to people on the first shift until the equipment has a sufficient track record of success. In this specific example, the authorization for the test could be manually adjusted to require Expert authorization for operators on the second and third shifts. Note the manual adjustment in step 340 is optional, and may not be performed in many instances. The recommended adjustment to the operator authorization is then determined according to the rules specified in the performance overrides (step 350). Similar operation models 260 are evaluated and an adjustment to the operator authorization for similar operations is determined (step 360). If there are any potential conflicts between the recommended adjustment from the unbiased performance determined in step 350 and the recommended adjustment for similar operations determined in step 360, these potential conflicts are resolved to produce a final adjustment (step 370). The final adjustment is then used to autonomically generate an adjusted operator authorization (step 380). If there are more operators to evaluate (step 390=YES), method 300 loops back to step 310 and continues until there are no more operators to evaluate (step 390=NO).

Figures 4, 5:
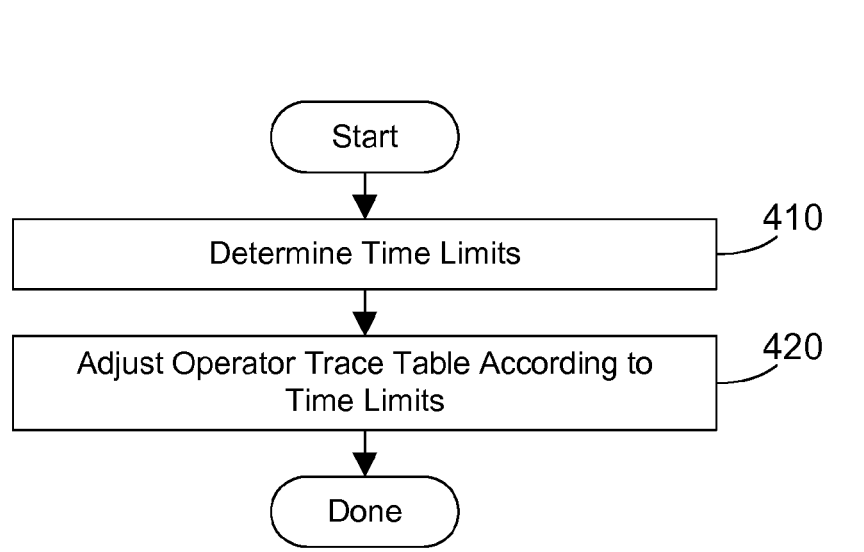
FIG. 4 is a flow diagram showing one suitable implementation of step 320 in FIG. 3.
FIG. 5 is a block diagram of sample time limits shown in FIG. 2 that may be used to autonomically adjust operator authorization according to the passage of time.

Referring to FIG. 4, a method 320 represents one suitable implementation for step 320 in FIG. 3. First, time limits are determined (step 410). Time limits 240 are preferably specified by a system administrator, and include one or more time thresholds that specify time periods that may be taken into account when evaluating potential adjustments to an operator's authorization. The operator trace table may then be adjusted according to the time limits (step 420) to only take into account the relevant experience of the operator according to the time limits. Note the operator trace table, even after applying the time limits, may include multiple periods of activity under multiple user IDs. The operator's trace table adjusted by the time limits may then be used in generating the unbiased authorization in step 330 and in evaluating the similar operation models in step 360.

One suitable example of time limits 240 in FIG. 2 is shown in FIG. 5. For this specific example, the time limits 240 specify a CURRENT USER TYPE column, a VALID PAST USER TYPES column, and a TIME FENCE column. Each entry in the time limits 240 provides information regarding a time fence (or threshold) that is applied to previous work experience or certifications of an operator. Entry 510 specifies if an operator is a vendor, experience for the past 12 months as a vendor may be taken into account. This means experience of an operator that is a vendor beyond 12 months is ignored, and all history over the past 12 months is taken into account, even when that history spans multiple periods of activity under multiple user IDs. Entry 520 specifies if an operator is an IBM employee, all experience as an IBM employee will be taken into account. Entry 530 specifies for all user types, experience for the past 18 months as an IBM employee will be taken into account, and no non-IBM experience will be taken into account. Time limits 240 allow a system administrator to specify time thresholds that allow an operator's past experience to be considered, but only back to the time specified in the thresholds. Note the time limits may apply to the operator trace table 244 as well as the unbiased authorization 250, and may operate to cut off some periods of past experience while preserving other periods of past experience. The time limits thus allow customizing the adjustment of operator authorization according to specified time thresholds so an operator's past experience may be taken into account (or not) based on the time thresholds.

Figures 6, 7:
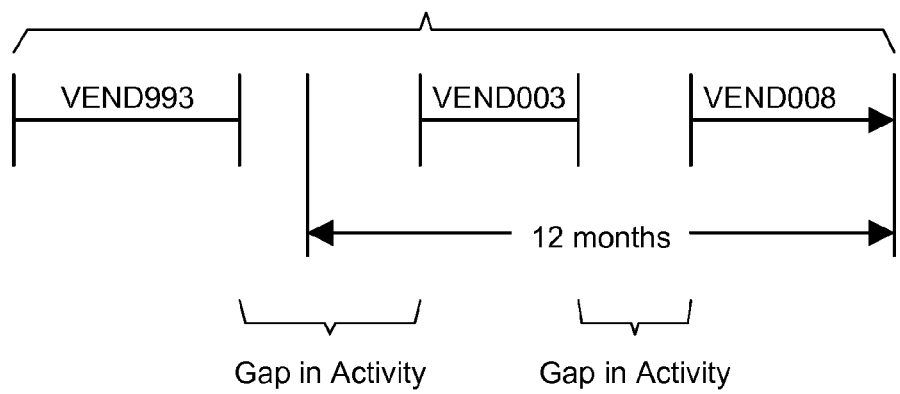
FIG. 6 is a block diagram of a sample operator trace table shown in FIG. 2.
FIG. 7 is a sample timeline showing gaps in activity for a sample operator.

Referring to FIG. 6, one suitable example of the operator trace table 244 in FIG. 2 is shown. The operator trace table 244 in FIG. 6 specifies a column for user ID/Alias, a column for Current UserID, a column for Date Activated, and a column for Past UserIDs.

Entry 610 shows that an operator ZEE BOB with a userID of ZBOB was activated Jun. 26, 1989, and has no past userIDs. Entry 620 shows an operator JANE DOE with a userID of VEND008 was activated Dec. 1, 2007, and has past userIDs of VEND003 and VEND993. Entry 630 shows an operator JAMES JOHN with a userID of VEND8888 was activated on Jun. 1, 2007, and has a past userID of JJOHN.

The combination of the time limits 240 in FIG. 5 and the operator trace table 244 in FIG. 6 allows taking an operator's past experience into account, but only for the time specified by the time thresholds in the time limits. We assume for this example that JANE DOE's history has gaps, as shown in the timeline in FIG. 7. These gaps represent periods of inactivity, when JANE DOE did not perform operations. In known systems for tracking employees, when Jane is re-hired the third time as VEND008,there would be no information available regarding Jane's past user IDs or authorizations, because her current user ID of VEND008 has no information relating to past activity. The operator trace table 244 provides information regarding past user IDS for Jane Doe, which allows her past experience to be considered according to the time limits. We assume the time threshold in the time limits in entry 510 in FIG. 5 applies, so only Jane Doe's experience in the past 12 months will be considered (see entry 510 in FIG. 5). For the specific example shown in FIG. 7, we assume the 12 months occurs during the gap between Jane Doe's activity as VEND993 and VEND003, as shown by the 12 month period in FIG. 7. As a result, Jane Doe's experience as user ID VEND003 will be taken into account, but her experience as VEND993 will not be taken into account due to the time limits in FIG. 5. By considering Jane's past experience according to time limits 240, Jane's authorization may be autonomically adjusted to reflect past experience and certifications that are within the time limits.

While the specific example in FIGS. 6 and 7 show gaps in JANE DOE's activity, this is given by way of example to show one or more periods when JANE DOE was not authorized to perform operations. Note this is not necessarily caused by unemployment. For example, JANE DOE could have been reassigned to a different area where she was not authorized to perform operations. The disclosure and claims herein extend to any suitable periods of activity interspersed with any suitable periods of inactivity, whether by unemployment, reassignment, or other reasons.

Figure 8:
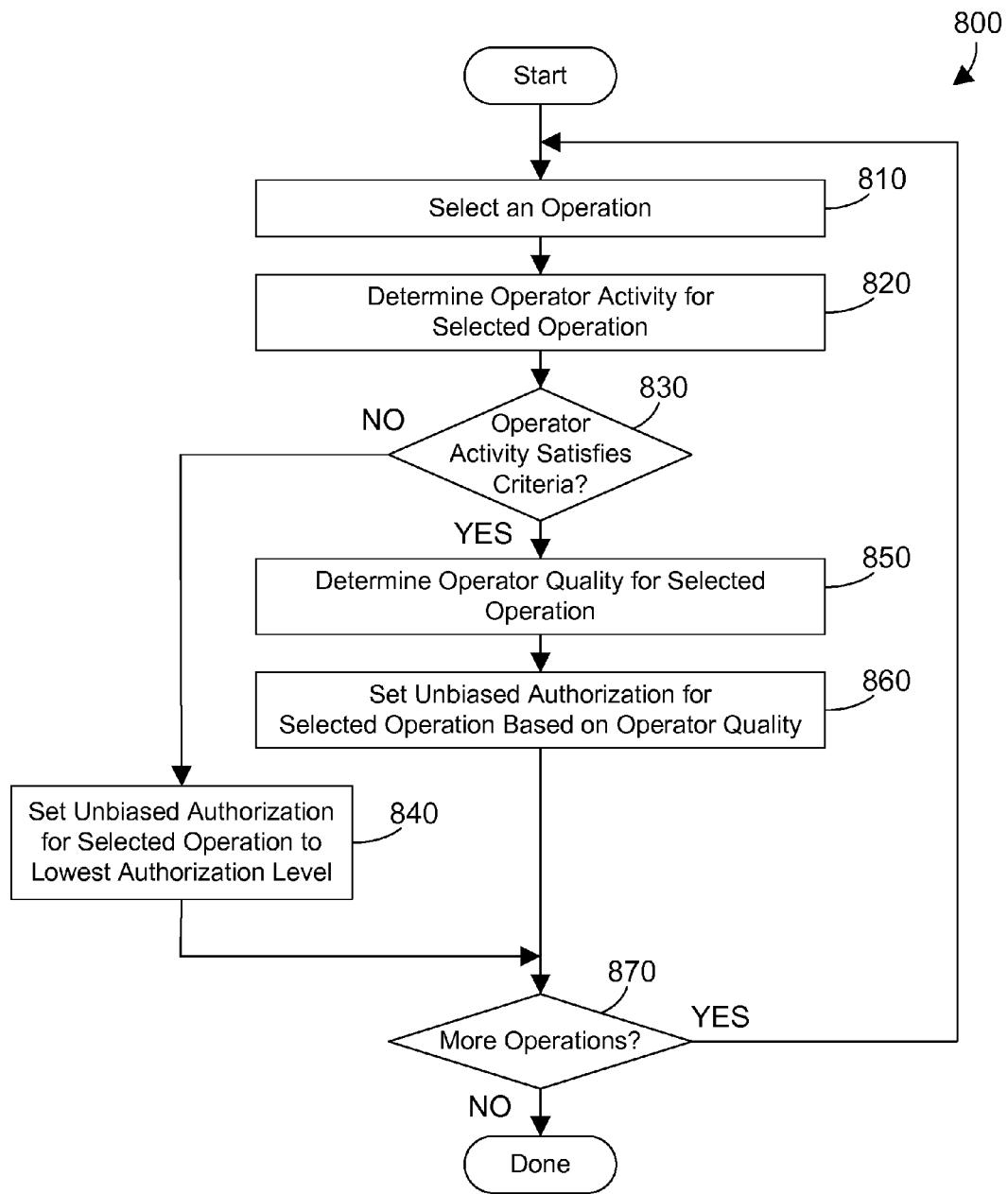
FIG. 8 is a flow diagram showing determination of an unbiased authorization shown in FIG. 2 according to the operator's activity for a selected operation.
Figure 17:
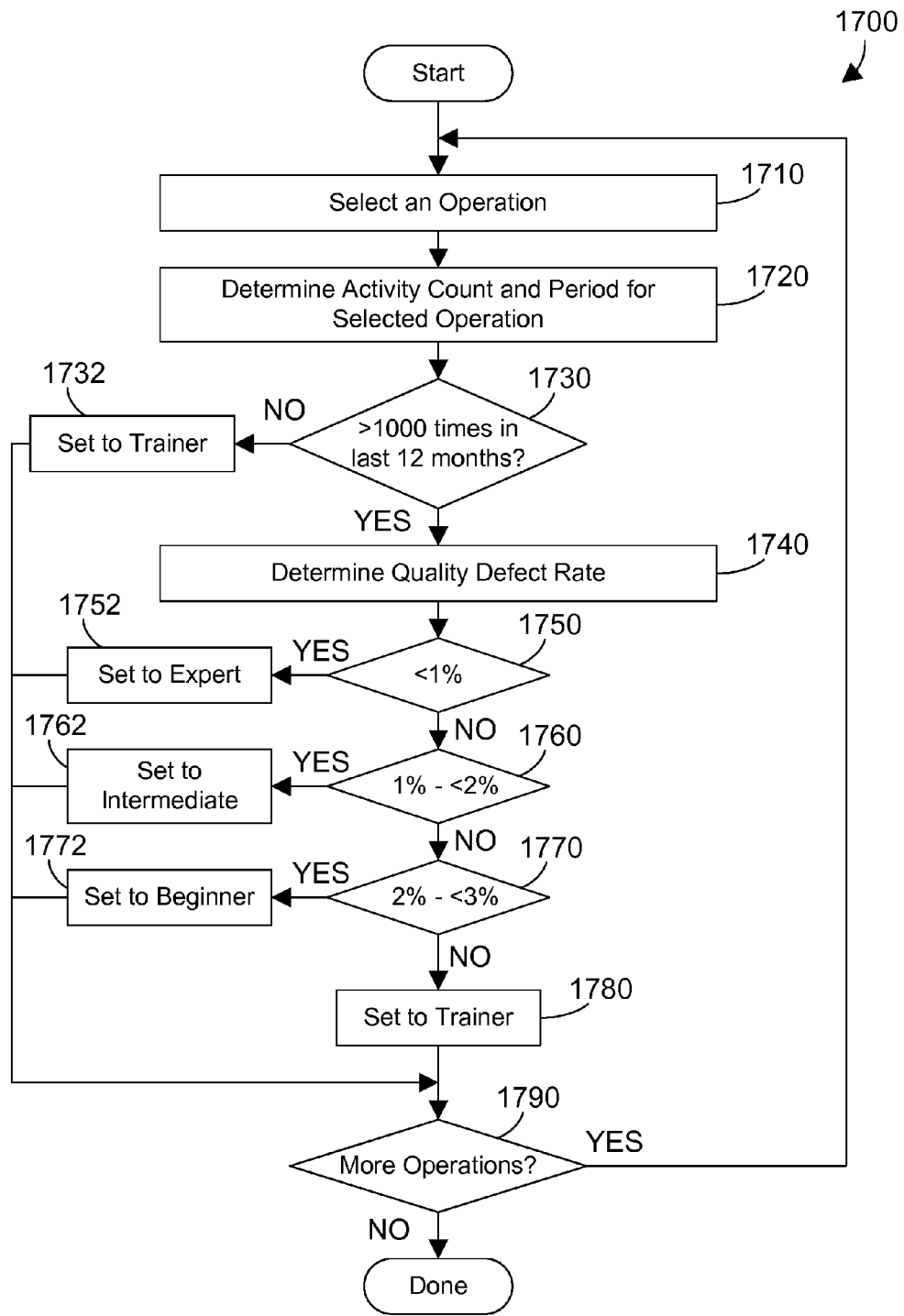
FIG. 17 is a flow diagram of one specific implementation of a method for assigning an unbiased authorization according to method 800 in FIG. 8.

FIG. 8 shows a sample method 800 for determining an unbiased authorization (e.g., 250 in FIG. 2) for a selected operator. First, an operation is selected (step 810). The operation selected in step 810 is an operation the operator has performed in the past. The operator activity for the selected operation is then determined from the selected operator's work history (step 820). Criteria is defined that, if satisfied, allows the unbiased authorization to be determined based on operator quality. In other words, the unbiased authorization is "unbiased" because it only takes into account the operator's actual performance in performing an operation in the past. If the operator activity does not satisfy the defined criteria (step 830=NO), the unbiased authorization is set to the lowest authorization level (step 840). In some implementations, the lowest authorization level in step 840 may be the lowest authorization that allows the operator to perform the operation, while the lowest authorization level in step 840 in other implementations may have a "not authorized" authorization level or a "null" authorization level, indicating the unbiased authorization was not based on the operator's activity in performing the selected operation. If the operator activity satisfies the criteria for having the operator's performance determine the unbiased authorization (step 830=YES), the operator quality for the select operation is determined (step 850). The unbiased authorization is then set based on the operator quality (step 860). For example, let's assume there are four different authorization levels defined: trainer, beginner, intermediate, and expert. The unbiased authorization will be set to one of these four levels in step 860 depending on quality criteria that determines the quality of the operator's past work in performing the selected operation. Of course, method 800 supports any suitable number or type of authorization levels. If there are more operations to evaluate (step 870=YES), method 800 loops back to step 810 and continues until there are no more operations to evaluate (step 870=N0). Note the authorization level for the selected operator to perform a selected operation is based solely on the work history for the operator, and does not take into account the operator's current authorization for that operation. In this manner, the operator's current authorization for the operation can be compared to the unbiased authorization to determine according to the rules in the performance overrides if an adjustment to the operator's authorization is needed. A specific implementation for method 800 in FIG. 8 is shown in FIG. 17 and is discussed in detail below.

Figure 9:
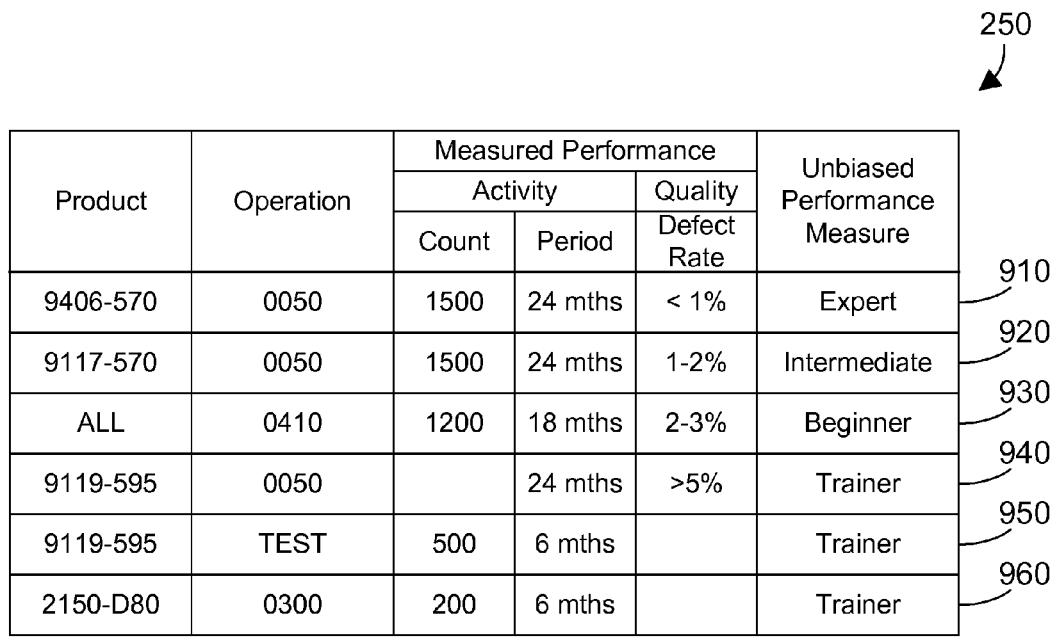
FIG. 9 is a block diagram of a table that shows a sample unbiased authorization shown in FIG. 2 for a selected operator.

A table 250 in FIG. 9 is one suitable implementation for an unbiased authorization 250 shown in FIG. 2 for a selected operator. The table includes a column for Product, a column for Operation, columns for the Activity Count and Period, a column for the Defect Rate, and the resulting Unbiased Authorization for the operation. We assume the method 800 in FIG. 8 is applied to the data in each entry in table 250 to determine the unbiased authorization for each operation. Thus, the data in entry 910 results in an unbiased authorization of Expert. In similar fashion, the unbiased authorization for entry 920 is Intermediate; for entry 930 is Beginner; for entry 940 is Trainer; for entry 950 is Trainer; and for entry 960 is Trainer. The unbiased authorization is easily determined using method 800 in FIG. 8 using the data in each entry.

FIG. 10 shows a table 270 that is one suitable implementation for the performance overrides 270 in FIG. 2. Performance overrides in table 270 are a set of rules that determine how to adjust an operator's authorization to perform certain operations. Entry 1010 specifies if an operator has been working on the 0050 operation on the 9406-570 product for more than 15 days as a Trainer and has not certified to the next level of authorization, the operator's Trainer authorization is revoked. Entry 1020 specifies if an operator has not performed the TEST operation for the 9117-570 product for 60 or more days, then reduce the authorization to the next lower level. Thus, assuming the four authorization levels shown in FIG. 8, namely Starter, Beginner, Intermediate and Expert, if the operator had an authorization of Expert, the authorization for the operator would be reduced to Intermediate. Entry 1030 specifies if an operator has not performed operation 0410 for any product for more than 120 days, then revoke the operator's authorization to perform the operation. Entry 1040 specifies if an operator for operation 0050 on product 9119-595 has a defect rate of more than five percent in the past three months, revoke the operator's authorization to perform operation 0050 on product 9119-595. Entry 1050 specifies if an operator with an authorization of Trainer to perform operation TEST on product 9119-595 has not been certified to a higher level and has a defect rate more than three percent, revoke the operator's authorization to perform operation TEST on product 9119-595. Entry 1060 specifies if the operator's current authorization is Expert for operation 0300 on product 2150-D80, and the operator does not perform operation 0300 on product 2150-D80 in the past 90 days, the operator's current authorization is reduced one level to Intermediate. Entry 1070 specifies for an operator that has an authorization of Beginner for operation 0300 on product 2150-D80 and has achieved in the past three months a defect rate of less than one percent, the operator's authorization is adjusted to Intermediate. Of course, the entries 1010-1070 shown in FIG. 10 are simple examples of suitable rules that could provide a desired adjustment to an existing operator authorization. One skilled in the art will readily appreciate that many different types of rules could be formulated to increase an operator's authorization, decrease an operator's authorization, or revoke an operator's authorization. The disclosure and claims herein expressly extend to any suitable rule for increasing, decreasing, or revoking an operator's authorization. Note the adjusting of an operator's authorization in the disclosure and claims herein includes increasing, decreasing or revoking the operator's authorization to perform a selected operation, or adding authorization for the operator to perform one or more similar operations.

Figure 11:
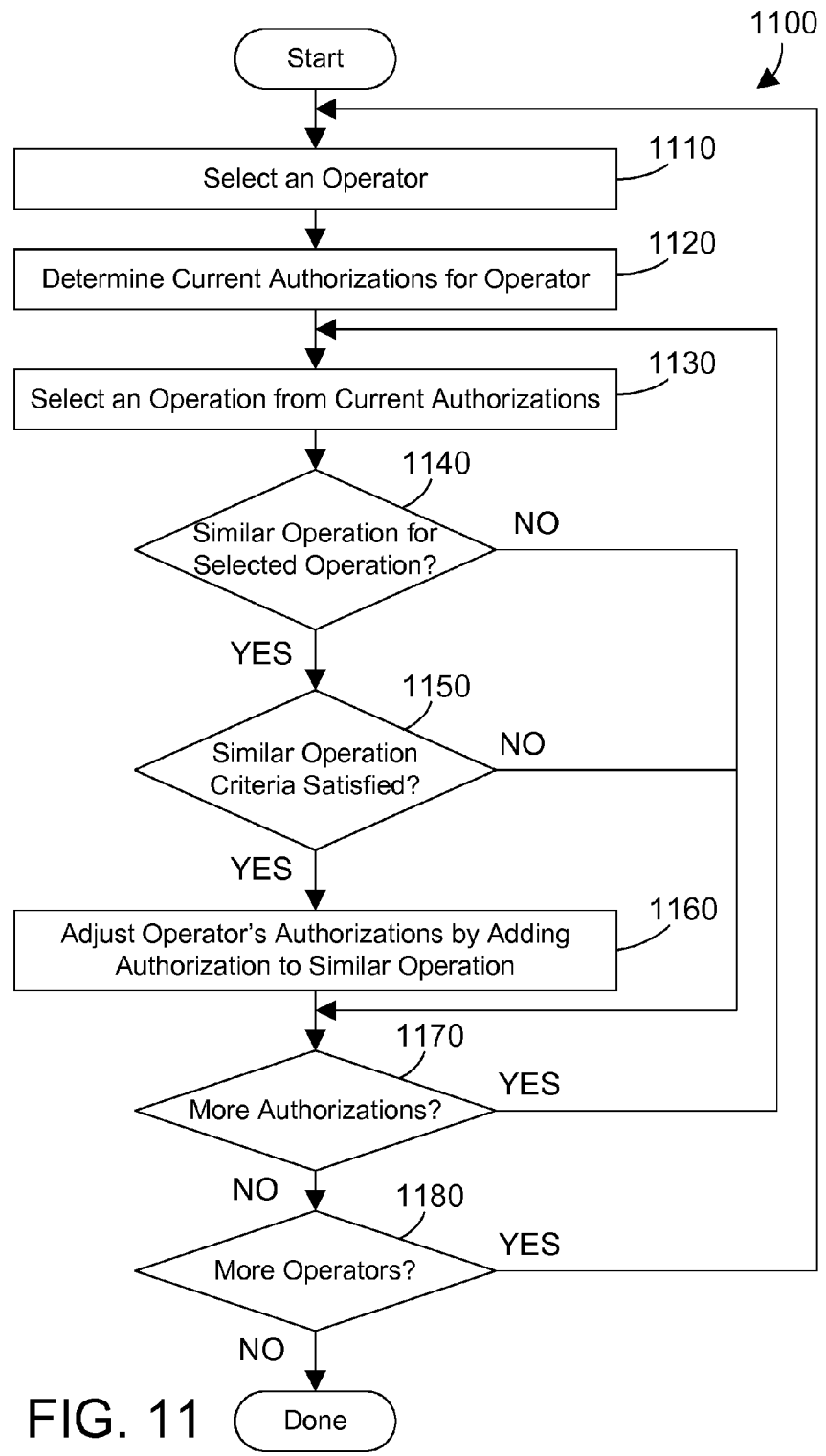
FIG. 11 is a flow diagram of a method for autonomically adding authorization for an operator to perform similar operations.

Referring to FIG. 11, a method 1100 shows steps that could be performed by the authorization adjustment mechanism 290 in FIG. 2. Note the logic for method 1100 could be encapsulated in the similar operation models 260 in FIG. 2, or could be in the authorization adjustment mechanism 290, which operates on the similar operation models 260. An operator is selected (step 1110). The current authorizations for the operator are determined (step 1120). This may be done, for example, by reading the operator authorization 124 shown in FIGS. 1 and 2. An operation is selected from the current authorizations (step 1130). If the similar operation models 260 define a similar operation to the selected operation (step 1140=YES), method 1100 checks to see if similar operation criteria in the similar operation models 260 are satisfied (step 1150). If so (step 1150=YES), the operator's authorizations are adjusted by adding an authorization to the similar operation (step 1160). If there is no similar operation defined for the selected operation (step 1140=NO), or if there is a similar operation defined for the selected operation but the criteria for the similar operation is not satisfied (step 1150=NO), step 1160 is skipped, and the operator's authorizations are not adjusted. If there are more authorizations to process (step 1170=YES), method 1100 loops back to step 1130 to select another operation, and continues. When there are no more authorizations to process for a selected operator (step 1170=NO), if there are more operators to process (step 1180=YES), method 1100 loops back to step 1110 to select a different operator, and continues. Once all authorizations for all operators have been processed (step 1180=NO), method 1100 is done.

The similar operation models 260 in FIG. 2 provide rules that define when operations can be considered similar enough to autonomically adjust operator authorization to authorized one or more similar operations. FIGS. 12 and 13 shows suitable tables that could be included in the similar operations models 260. Table 1200 defines similar operation groups, and includes columns for Similar Operation ID, Key for Base Authorization, Current Performance Level, # Authorizations within this Similar Operation Group, and Authorization Recommended for Other Activities in this Similar Operation Group. Entry 1210 specifies if an operator has a current authorization of Expert in two of the three operations in the Key for Base Authorization column, the authorization recommended for other activities in this similar operation group will be Intermediate. Entry 1220 specifies if an operator has a current authorization of Expert in one of the three operations in the Key for Base Authorization column, the authorization recommended for other activities in this similar operation group will be Beginner. Table 1200 thus defines similar operation groups along with criteria that, when satisfied, allows autonomically adjusting authorization for a selected operator to authorize the selected operator to perform similar operations, even when the operator has never had authorization to perform those operations in the past.

Table 1300 in FIG. 13 includes logic for determining when operations are similar. The one entry in table 1300 specifies that when an operator has an authorization greater than or equal to Expert for the TEST operation on the 9119-595 product, the operator may be autonomically granted Intermediate authorization to perform operation 0050 on the same product. Note that tables 1200 and 1300 show two different ways to define the similar operations models 260 in FIG. 2. Note that similar operation models 260 may have any suitable structure or form, including data and logic, that allows for both simple and complex rules to be formulated. Any and all rules that define any degree of similarity between operations are within the scope of the disclosure and claims herein.

Table 1400 in FIG. 14 defines what authorization to apply when different analyses reach different recommended adjustments to the operator authorization. Table 1400 defines rules that may be used by step 370 in FIG. 3 to resolve potential conflicts between desired adjustments. Table 1400 could be implemented as part of the performance overrides 270 shown in FIG. 2. Entry 1410 specifies for operation 0050 on product 9406-570, the highest operator authorization is used. Thus, if the unbiased authorization specifies an authorization of Expert for this operation, but the similar operations analysis specifies an authorization of Intermediate for this operation, the operator authorization for this operation will be adjusted to Expert, which is the highest of the two. Entry 1420 specifies for operation 0050 on product 9117-570, the lowest operator authorization is used. Thus, if the unbiased authorization specifies an authorization of Expert for this operation, but the similar operations analysis specifies an authorization of Intermediate for this operation, the operator authorization for this operation will be adjusted to Intermediate, which is the lowest of the two. Entry 1430 specifies for operation 0410 on all products, the authorization of the unbiased authorization will be used. Thus, if the unbiased authorization specifies an authorization of Intermediate for this operation, but the similar operations analysis specifies an authorization of Expert for this operation, the operator authorization for this operation will be adjusted to Intermediate, which is the unbiased authorization. Entry 1440 specifies for operation 0050 on product 9119-595, the authorization produced by the similar operation analysis will be used. Thus, if the unbiased authorization specifies an authorization of Intermediate for this operation, but the similar operations analysis specifies an authorization of Expert for this operation, the operator authorization for this operation will be adjusted to Expert, which is the recommendation of the similar operations analysis.

FIG. 15 shows a table 1500 that is one suitable implementation for the time phased operator performance 230 shown in FIG. 2. Table 1500 includes columns for Product, Operation, User ID, Start Timestamp and End Timestamp. We assume the manufacturing system logs the time phased operator performance into table 1500 as the operator works. Entry 1510 shows the operator with the user ID of VEND008 (which corresponds to Jane Doe—see table 244 in FIG. 6) started operation 0200 on product 520 on Mar. 11, 2010 at 7:00 AM, and ended the operation the same day at 7:17 AM. Entry 1520 shows the operator started operation 0300 on product 550 at 7:18 AM the same day, and ended the operation at 7:40 AM. Entry 1530 shows the operator started operation 0050 on product 570 at 7:41 AM the same day, and ended the operation at 8:11 AM. Entry 1540 shows the operator started operation 0060 on product 570 on Mar. 7, 2010 at 7:00 AM, and ended the operation at 8:42 AM. The table 1500 that logs the time phased operator performance may then be used to determine the unbiased authorization for the operator, as described in detail above.

FIG. 16 shows a table 1600 that is one suitable implementation for the operator quality 220 shown in FIG. 2. Table 1600 includes columns for Product, Operation, User ID, Defect Rate, and Failures. We assume the manufacturing system logs the operator quality into table 1600 as the operator works. Entry 1610 shows the operator with the user ID of VEND008 had a defect rate of 1.3% with a total of 7 failures for operation 0050 on product 520. Entry 1620 shows the operator had a defect rate of 1.5% with a total of 11 failures for operation 0050 on product 550. Entry 1630 shows the operator had a defect rate of 1.7% with a total of 8 failures for operation 0050 on product 570. Entry 1640 shows the operator had a defect rate of 3.4% with a total of 16 failures for operation 0060 on product 570. The table 1600 that logs the operator quality may then be used to determine the unbiased authorization for the operator, as described in detail above.

FIG. 17 shows a sample method 1700 that is one suitable implementation for determining an unbiased authorization (e.g., 250 in FIG. 2) for a selected operator in accordance with method 800 in FIG. 8. First, an operation is selected (step 1710). The operation selected in step 810 is an operation the operator has performed in the past. The activity count and period is then determined for the selected operation from the selected operator's work history (step 1720). If the selected operator has performed the selected operation more than 1000 times in the last 12 months (step 1730=YES), the quality defect rate is determined from the selected operator's work history (step 1740). If the defect rate is less than one percent (step 1750=YES), the authorization for the operator to perform the selected operation is set to Expert (step 1752). If the defect rate is not less than one percent (step 1750=NO) but is less than two percent (step 1760=YES), the authorization for the operator to perform the selected operation is set to Intermediate (step 1762). If the defect rate is not less than two percent (step 1760=NO) but is less than three percent (step 1770=YES), the authorization for the operator to perform the selected operation is set to Beginner (step 1772). If the defect rate is three percent or more (step 1770=N0), the authorization for the operator to perform the selected operation is set to Trainer (step 1780). In addition, if the selected operator did not perform the selected operation more than 1000 times in the past 12 months (step 1730=NO), the authorization for the operator to perform the selected operation is set to Trainer (step 1732). If there are more operations to evaluate (step 1790=YES), method 1700 loops back to step 1710 and continues until there are no more operations to evaluate (step 1790=N0). Note the unbiased authorization level for the selected operator to perform a selected operation is based solely on the work history for the operator, and does not take into account the operator's current authorization for that operation. In this manner, the operator's current authorization for the operation can be compared to the unbiased authorization to determine according to the rules in the performance overrides if an adjustment to the operator's authorization is needed.

The disclosure and claims relate to autonomically adjusting operator authorizations according to many factors, including the passage of time, the operator's work history that spans multiple periods of activity with one or more periods of inactivity, current performance, and similar operations. One or more rules are defined that determine how to autonomically adjust an authorization for an operator. Note the term "autonomically adjust" in the context of the disclosure and claims means adjustment of the operator authorization that is preferably performed real-time based on information within the manufacturing system and without requiring any input from any operator or system administrator at the time the adjustment is made. A manufacturing system that incorporates the autonomic adjustment of operator authorizations as disclosed herein can easily account for an operator's past work history, even when that history includes multiple activity periods, can account for knowledge decay with the passage of time, can account for the operator's actual performance, and can account for similar operations according to defined similar operation models.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for autonomically adjusting an operator authorization for a selected operator to perform a selected operation in a manufacturing environment, the method comprising the steps of:
   determining work history for the selected operator in performing the selected operation by computing an unbiased authorization for the selected operator based on performance for the selected operator in performing the selected operation and defect percentage for the selected operator in performing the selected operation, wherein the work history for the selected operator spans multiple time periods with at least one period of inactivity between the multiple time periods, where each time period and each period of inactivity specifies a range of dates;
   determining at least one portion of the work history that is applicable to the selected operator according to at least one time threshold; and
   autonomically adjusting an authorization for the selected operator to perform the selected operation based on the work history of the selected operator that satisfies the at least one time threshold by applying a plurality of override rules that determine when adjusting the operator authorization for the selected operator to perform the selected operation is needed based on the unbiased authorization, applying the plurality of override rules to the unbiased authorization and to a current operator authorization to determine a final adjustment to the operator authorization, and applying the final adjustment to the operator authorization.

2. The method of claim 1 wherein the work history includes performance for the selected operator in performing the selected operation and defect percentage for the selected operator in performing the selected operation.

3. The method of claim 1 further comprises the steps of:
   evaluating a plurality of similar operation rules to determine whether the operator authorization for the selected operator allows granting authorization to at least one similar operation; and
   when the operator authorization for the selected operator allows granting authorization to the at least one similar operation, adjusting the operator authorization to provide authorization for the selected operator to perform the at least one similar operation.

4. The method of claim 1 further comprising the step of revoking the authorization for the selected operator to perform the selected operation when the work history for the selected operator to perform the selected operation is beyond a period specified by the at least one time threshold.

5. The method of claim 1 further comprising the step of permitting the selected operator to perform the selected operation on a physical machine.

6. A computer-implemented method executed by at least one processor for autonomically adjusting a first operator authorization for a selected operator to perform a selected operation in a manufacturing environment, the method comprising the steps of:
   (A) reading the first operator authorization for the selected operator;
   (B) computing a second operator authorization for the selected operator based on work history for the selected operator and a plurality of time thresholds, wherein the work history includes performance for the selected operator and defect percentage for the selected operator in performing the selected operation, wherein the work history for the selected operator spans multiple time periods with at least one period of inactivity between the multiple time periods, wherein only the work history that satisfies the plurality of time thresholds is used in computing the second operator authorization;
   (C) reading a third operator authorization for the selected operator that is manually entered by a system administrator;
   (D) evaluating the first, second and third authorizations for the selected operator according to a plurality of override rules that determine when adjusting the first operator authorization for the selected operator to perform the selected operation is needed;
   (E) evaluating a plurality of similar operation rules to determine whether the first, second and third operator authorization for the selected operator allows granting authorization to at least one similar operation;
   (F) when the plurality of override rules evaluated in step (D) indicate a first adjustment to the first operator authorization for the selected operator to perform the selected operation is needed, and the plurality of similar operation rules evaluated in step (E) indicate a second adjustment to the first operator authorization for the selected operator to perform the selected operation is needed, resolving any potential conflict between the first and second adjustments according to at least one predetermined rule to generate a final adjustment to the first operator authorization;
   (G) autonomically adjusting the first operator authorization using the final adjustment for the selected operator to perform the selected operation; and
   (H) allowing the first operator to perform the selected operation on a physical machine when the adjusted first operator authorization authorizes the selected operator to perform the selected operation.

* * * * *